(No Model.)  2 Sheets—Sheet 1.
B. TEIPEL.
TRAP FOR THROWING TARGETS.
No. 302,691. Patented July 29, 1884.
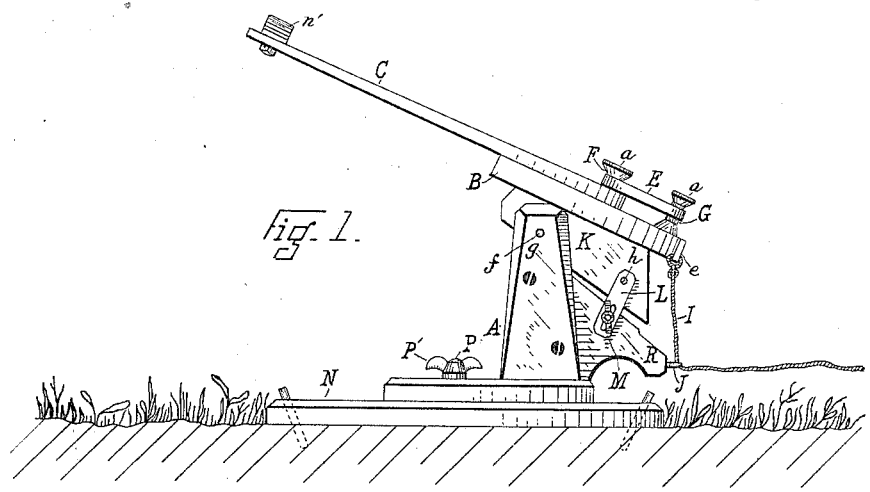
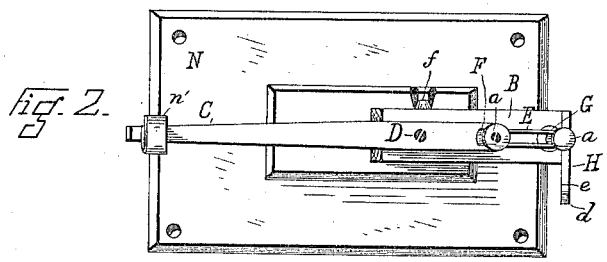
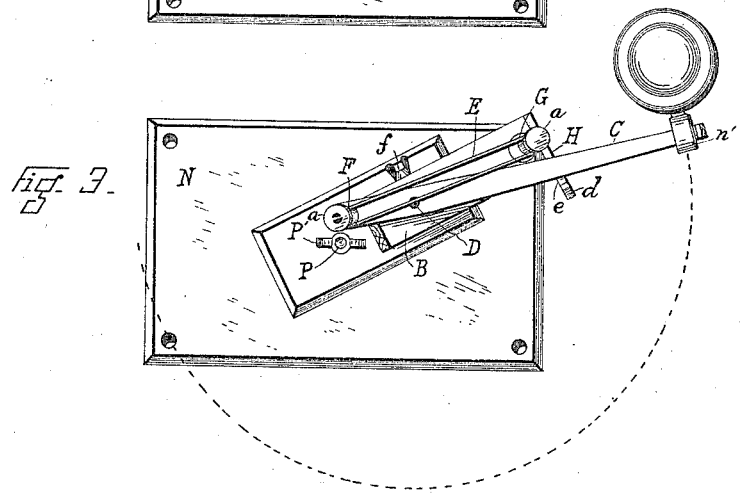
Attest  
Walter Chamberlin  
O. M. Hill
Inventor  
Benjamin Teipel  
per Wm. Hubbell Fisher  
Atty.

(No Model.) 2 Sheets—Sheet 2.

B. TEIPEL.
TRAP FOR THROWING TARGETS.

No. 302,691. Patented July 29, 1884.

Attest
Walter C. Chamberlin.

Inventor
Benjamin Teipel
per Wm. Hubbell Fisher,
Atty.

N. PETERS, Photo-Lithographer, Washington, D. C.

UNITED STATES PATENT OFFICE.

BENJAMIN TEIPEL, OF COVINGTON, KENTUCKY, ASSIGNOR OF ONE-HALF TO WILLIAM F. POWELL, OF CINCINNATI, OHIO.

TRAP FOR THROWING TARGETS.

SPECIFICATION forming part of Letters Patent No. 302,691, dated July 29, 1884.

Application filed February 29, 1884. (No model.)

*To all whom it may concern:*

Be it known that I, BENJAMIN TEIPEL, a resident of the city of Covington, in Kenton county and State of Kentucky, have invented certain new and useful Improvements in Traps for Throwing Targets, of which the following is a specification.

The several features of my invention and the various advantages resulting from their use, conjointly or otherwise, will be apparent from the following description.

Figure 4:
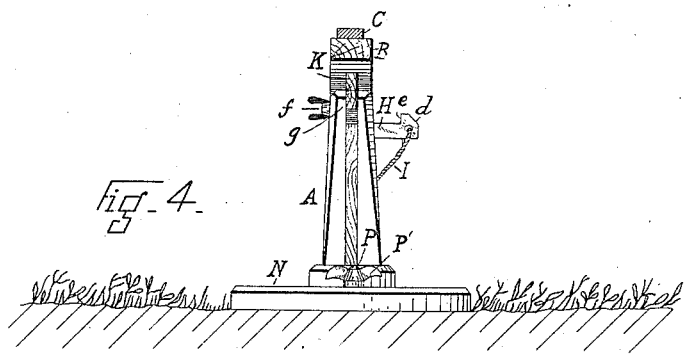
Figure 5:
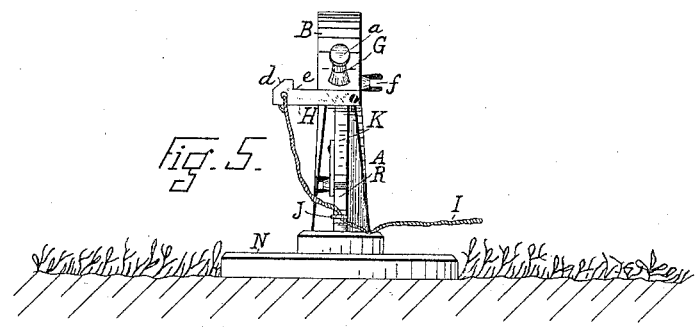
Figure 6:
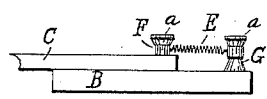
Figure 7:
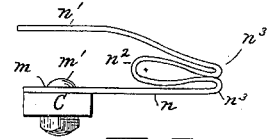
Figure 8:
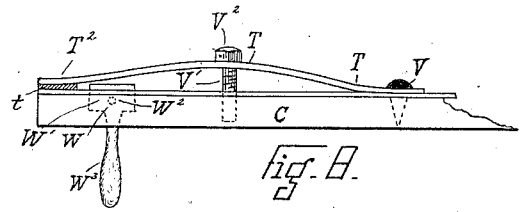
Figure 10:
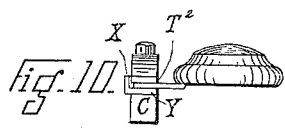
Figure 9:
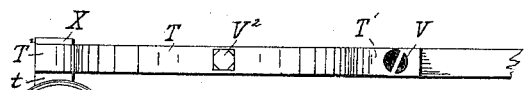

In the accompanying drawings, making part of this specification, Figure 1 represents a side elevation of a target-trap illustrating my invention. Fig. 2 is a plan view of said trap, the throwing-lever being unlocked and the trap sprung. Fig. 3 represents a plan view of said trap, the throwing-lever being locked, and the trap ready to throw the target as soon as the latch or trigger is pulled. Fig. 4 represents a front elevation of the trap, that part of the end of the throwing-lever which extends beyond the end of the supporting-frame having been removed. Fig. 5 represents a rear elevation of the said trap, the throwing-lever having been removed. Fig. 6 is a side elevation of the rear portion of the throwing-lever and its immediate preferred support, and showing a spiral spring for throwing the lever. Fig. 7 represents one form of spring-clamp to be connected to the free end of the throwing-lever, and which may be employed to hold the target when the latter is of that description of targets which are thrown by means of a tongue projection, the clamp holding the tongue or projection while the lever is in motion. Fig. 8 represents a side elevation of a spring-clamp for the same general purpose as the clamp shown in Fig. 7, but provided with means for increasing or diminishing and regulating the pressure of the opposing end portions of the clamp upon the tongue or projection of the target which is between them, the target itself having been removed, so as to show the end portions of the clamp and the target-tongue between them. Fig. 9 represents a top view of the devices shown in Fig. 8, with the exception that, whereas in Fig. 8 a target is omitted and only a tongue is shown; in the present figure a target also is represented; and Fig. 10 is an elevation of the outer end of said clamp of the preceding figure, and showing the clamp engaging the tongue of a target.

A indicates the main standard. This standard upholds in a suitable manner a bed-piece, B. To the forward portion of this piece the throwing-lever C is pivoted on a suitable pivot, as D, so as to allow the lever to turn laterally on the said pivot. A spring is connected to the rear end of this lever, and also to the bed-piece B. A preferred form of this spring is one that is elastic in the direction of its length. When a spring of the latter kind is employed, a rubber loop or loops, E, will be found desirable. This loop or loops can be passed over a projection, F, on the throwing-lever C, and over a projection, G, on the rear end of the bed-piece B, and strained between the said projections F G. In such event these projections are preferably provided with enlarged stops, as *a*, to prevent the loops from slipping off.

By substituting a loop of a greater or less elasticity and strength than that in use on the trap, the throwing-power of the lever C may be correspondingly increased or diminished. So, also, the amount of the strength and elasticity of this rubber-loop spring may be increased or diminished by increasing or diminishing the number of loops. This latter will often be found a convenient mode of regulating the strength of the spring.

When a spiral or other spring is substituted for a rubber one, it may be connected to the projections F and G, formed as shown; or these projections may consist of eyes or hooks, &c., or of any construction adapted to conveniently and securely hold the said spring and connect it to lever C and to the bed-piece B.

When the trap is to be set, the throwing-lever is bent around until its throwing end is at the rear of the bed-piece B and its length is nearly parallel to the length of said bed-piece. (See Fig. 3.) In this position it is locked by the latch H, suitably pivoted to the standard or bed-piece. Preferably the latch is connected, as shown, to the end of the bed-piece by a pivot, *b*. The latch is of any desired form; but the common form with beveled free end *d* and shoulder *e* is desirable, and when thus formed the lever, when set, lies against the shoulder *e* of the latch, and this shoulder prevents the lever from moving until the latch is intentionally moved. Connected to the latch are suitable means for forcibly moving it to release the lever, one description of such means being the cord I. For enabling this cord to act more directly upon the latch and draw it in the plane of its movement on the pivot, an eye, J, is provided, preferably connected to standard A or to an extension of same, so as to move with said standard, and always be in the same relative position as to said latch. A target having been connected to or placed on the free end of the throwing-lever C, the cord I is pulled and the latch disconnected from said lever C. The strained spring being now free to act, and pulling upon that end of the lever which carries projection F, draws this end of the lever rearward, and at the same time carries the other end of the lever with the target rapidly forward in the arc shown by the dotted line in Fig. 3. The lever, upon reaching its position shown in Fig. 2, is prevented by the spring from moving much farther, and discharges its target.

While this trap is applicable for throwing targets of any desired shape, it is particularly valuable for throwing discal targets which are thrown by means of a tongue or projection connected to or forming a part of the said disk. It always has been and now is a desideratum to provide such a movement of the throwing-arm of the trap as shall not unseat this tongue from its place within the clamp or holder on the end of the throwing-arm. In the traps as heretofore made the throwing-arm, when unlatched, is started too quickly, and the tongue is frequently unseated, as aforementioned, and to prevent its being thus unseated by the quick movement of the throwing-lever, the clamp is often made to pinch the tongue of the target so tight that it will either not leave the throwing-lever when the latter has reached the end of its arcal movement, and consequently will be torn from the target, injuring the latter, or it will so reluctantly leave the clamp as that the target will not make its full and desired arc of independent movement after leaving the trap and before reaching the ground.

The preferred mode of combining my pivoted throwing-lever and spring and their connections obviates all these disadvantages. For instance, when the lever C is unlatched. the spring is indeed much strained; but it has very little power to move the lever C, as its (the spring's) pull is in a line nearly coincident with the longitudinal axis of the lever. The power of the spring when the lever is unlatched and ready to start being thus limited, the lever can start but slowly—in fact, it starts very slowly—and thus the discal target has ample time to easily receive and acquire the momentum of the throwing-arm through the agency of the tongue. For this reason the tongue need not be very tightly clamped or pinched by the clamp of the throwing-lever. As the throwing end of the target moves toward the middle of its arcal movement, every inch of its travel serves to give the spring more power to rapidly move the lever as the length of that end of the lever which carries projection F approaches a position at right angles to the length of the bed-piece, and thus affords the spring an opportunity of exerting a strong leverage upon the throwing-arm; consequently the throwing end of the latter and the target will acquire a great velocity. As the tongue of the target is not unduly pinched in the clamp of the lever, the target and tongue will readily and properly leave the clamp when the throwing-arm has completed its arcal movement, and will swiftly describe a large and proper curve before reaching the ground.

It is frequently desired to alter the vertical longitudinal inclination of the throwing-lever. This is to be done in any suitable manner. A preferred mode is as follows: The bed-piece B is supported on a piece, K, pivoted at *f* to the standard A. This piece had best be received between two portions, *g g*, of the standard, these portions *g g* serving as guides for the oscillatory piece K, and also preventing any lateral movement of the latter. To the rear end of this piece K is pivoted at *h* a link or slotted plate, L, whose slot *k* receives the shank of a thumb or set screw, M, screwed into the standard A or into an extension thereof, as shown, the head of the screw not only preventing the slotted plate from slipping off the screw when the latter is screwed up, but also enabling the screw to bind and set the plate at any given point within the limits of its slot. When the throwing end of the lever is to be lowered, the bed-piece, with oscillatory piece K, is elevated at rear, as illustrated in Fig. 1, and fixed in that position. The throwing end of the arm is to be elevated, the set-screw is loosened, and the rear end of the bed piece with piece K is lowered; and the set-screw again tightened. Thus the elevation of the arc described by the flying target can be altered.

The eye J for the cord I may be attached to the extension R.

The direction of the arc to be described by the target, considered in relation to any support that may, when desired, be employed to uphold the standard, may be fixed and changed at will by connecting the standard to said support—as, for example, N, by a pivot, P, and set-screw P'. On this pivot the standard may be turned to any desired point on the support N, and then set. Two of the many changes of positions which can be thus made are respectively indicated in Figs. 2 and 3.

A convenient form of spring-clamp is shown in Fig. 7, and consists of a piece of spring metal secured at *m* by a bolt, *m'*, to the free end of lever C, and consisting of part *n* and part $n^2$ and intervening loop *n'*. In using this clamp the free end of part *n'* is pressed down toward part n, and this pressure operates to open the ends $n^3 n^3$ of the clamp. The tongue or projection t of the target is then inserted, and the target is then in position to be thrown.

Another and preferable form of clamp is shown in Fig. 8, and consists of a piece, T, of spring metal connected at its rear end, T', to the free end portion of the throwing-lever C by a screw or bolt, V. The forward end, $T^2$, of the spring bears against the opposing end of lever C, which latter is preferably covered or shod with an iron plate, Y, at and in the vicinity of the spring. The pressure of the end $T^2$ of the spring upon its opposing end of the lever C can be increased or lessened by the screw V', which passes loosely through the spring-piece T and screws into the lever C, or an equivalent part, the head $V^2$ of the screw being sided or made so that a wrench or tourniquet can be applied to rotate, or provided with a permanent lever or other suitable means for turning it. This screw V' also serves to aid in preventing the spring-piece from being laterally displaced.

Should it be found that the tongue of the target does not readily leave the clamp, the tongue can be made to do so by the following means: At the side of the free end of the lever C is located a flange, X, which is so located as to come opposite the opening between the free ends of the clamp, when the latter are separated by a target-tongue. This flange is located at that side of the lever which is foremost when the lever is sprung and is throwing the target, and may be attached to the spring-piece T or to the lever. Preferably it is attached to plate Y when the latter is present. When a target is to be thrown, its tongue is placed between the free ends of the clamp with its rear or free end against or close to the flange X. When the lever C is sprung, it carries the target with it in a curve, and when the lever has reached the end of its throw and is checked, the impetus given to the target causes it, its tongue being held by the clamp, to whirl around the end of the lever, and the forward free corner or part of the tongue bears against the flange, and through the medium of the target the flange operates as a fulcrum, which the target employs to easily force the tongue out of the clamp. The target, then being free from the trap, describes its arc of flight, at the same time revolving on its transverse axis, which revolutions tend to steady it, and aid it in describing a uniform and extended flight. A preferred device for opening this clamp—that is to say, lifting the free end $T^2$ of the spring-piece T—consists of the piece W, having projection W', and pivoted by a pivot, $W^2$, to the lever C or equivalent part, and having a handle, $W^3$. By moving the handle $W^3$ to the right, where the parts are arranged as in Fig. 8, the end $T^2$ of the spring-piece is raised from lever C, and the tongue t of a target can be inserted between the end $T^2$ and lever C. After such insertion is made, the handle is moved back or allowed to fall back to a perpendicular position, when the end $T^2$ of the spring-piece will be tightly pressed upon the tongue t, and the latter will be well clamped between end $T^2$ and the end of the lever C, and the target will then be ready to be thrown.

While the various features of my invention are preferably employed together, one or more of them may be employed without the remainder. Furthermore, one or more of said features may be employed, so far as applicable, in connection with target-traps other than the one herein specifically described.

What I claim as new, and desire to secure by Letters Patent, is—

1. In a trap for throwing targets, the combination of the lever C, pivot D, substantially vertical, on which the lever turns, bed or supporting-piece B, spring E, strained between that end of the lever C which is behind the pivot D and that portion of the bed-piece which is still farther in the rear, substantially as and for the purposes specified.

2. In a trap for throwing targets, the combination of the lever C, pivot D, substantially as described, for enabling the end of the lever to move in a plane substantially horizontal, bed-piece B, holding-pivot D, and spring E, strained between projection F, located on the rear portion of said lever C, and at the rear of the pivot D, and projection G, located on the rear end of said bed-piece and behind projection F, and latch H, located at or near the rear projection, G, for holding the lever when set in such a position that its longitudinal axis is nearly coincident with a straight line passing through said projection, substantially as and for the purposes specified.

3. In a trap for throwing targets, the combination of the lever C, pivot D, substantially as described, for enabling the end of the lever to move in a plane substantially horizontal, bed-piece B, holding-pivot D, and spring E, strained between projection F, located on the rear portion of said lever C and at the rear of the pivot D, and projection G, located on the rear end of said bed-piece and behind projection F, these projections having enlarged tops a, and latch H, located at or near the rear projection, G, for holding the lever when set in such a position that its longitudinal axis is nearly coincident with a straight line passing through said projection, substantially as and for the purposes specified.

4. In combination, the laterally-moving lever C, and the bed-piece or support and pivot D, and the projection F on the rear end of lever C and behind the pivot D, and stationary projection G, rigidly located on a part of the trap other than the throwing-lever, and catch located at the rear of said standard, substantially as and for the purposes specified.

5. In a target-trap, the combination of the bed-piece B, having a uniform smooth upper surface, containing at rear projection G, and lever C, pivoted to and at its under surface resting and rotating on the said bed-piece, and provided with projection F, located on the lever behind the pivot, and a spring, E, strained between said projections and latch, substantially as and for the purposes specified.

6. In combination, the laterally-moving lever, bed-piece, the vertical piece K, connected to and supporting the bed-piece and standard A, the piece K being pivoted near one end to said standard by a pivot, $f$, lying in a substantially-horizontal plane, and means for adjusting the inclination of the piece K, and consequently the inclination of lever C, substantially as and for the purposes specified.

7. In combination, the laterally-moving lever, bed-piece, the vertical piece K, connected to and supporting the bed-piece and standard A, the piece K being pivoted near one end to said standard by a pivot, $f$, lying in a substantially-horizontal plane, and pivoted plate L, and set-screw M, and extension R of the standard, substantially as and for the purposes specified.

8. In combination, the laterally moving lever, bed-piece, the vertical piece K, connected to and supporting the bed-piece, and standard A, having the separated guides $g$ $g$, the piece K being pivoted near one end to said standard by a pivot, $f$, lying in a substantially-horizontal plane and working between said guides $g$ $g$, and means for adjusting the inclination of the piece K, and consequently the inclination of lever C, substantially as and for the purposes specified.

9. In combination, the laterally-moving lever, bed-piece, the vertical piece K, connected to and supporting the bed-piece, and standard A, having the separated guides $g$ $g$, the piece K being pivoted near one end to said standard, and pivoted plate L, and set-screw M, and extension R, of the standard, substantially as and for the purposes specified.

10. In a target-trap, the combination of the bed-piece B, having a uniform smooth upper surface, containing at rear projection G, and lever C, pivoted to and at its under surface resting and rotating on the said bed-piece, and provided with projection F, located on the lever behind the pivot, and spring E, strained between said projections and latch, and means for altering the vertical inclination of the longitudinal axis of said throwing-lever C, substantially as and for the purposes specified.

11. In a target-trap, the combination of the laterally-moving throwing-lever C, bed-piece B, to which said lever is pivoted and on which said lever moves, spring connected to the rear end of the throwing-lever and behind the pivot of the throwing-lever, and also connected to the bed-piece or equivalent part at the rear of the lever, and latch pivoted at rear of bed-piece, piece K supporting bed-piece B, standard A, having vertical guides $g$, between which the piece K moves, being pivoted by a pivot, $f$, substantially horizontal, and pivoted plate L, and set-screw M, substantially as and for the purposes specified.

12. In combination, the laterally-moving lever, its bed-piece, standard A, having foot provided with set-pivot P P', and bottom plate or foundation piece, N, on which said foot rests and turns, substantially as and for the purposes specified.

13. In combination, the laterally-moving lever, its bed-piece, standard A, having foot provided with set-pivot P P', and bottom plate or foundation piece, N, on which said foot rests and turns, and means for adjusting the vertical inclination of the longitudinal axis of said lever, substantially as and for the purposes specified.

14. In combination with the throwing-lever of the trap, a clamp having spring-piece T, connected at its rear end to the lever, and central tightening-screw, V' V$^2$, and lever W, having projection W', and handle W$^3$, and pivoted at W$^2$, substantially as and for the purposes specified.

15. The combination of the throwing-lever, the spring-clamp connected to said lever, and the flange X at the side of the clamp, substantially as and for the purposes specified.

16. The combination of the throwing-lever, spring-piece T, connected at its rear to the lever, having central tightening-screw, V$^2$, and flange X at one side of the free end of the clamp, substantially as and for the purposes specified.

17. The combination of the throwing-lever, spring-piece T, connected at its rear to the lever, having central tightening-screw, V$^2$, and flange X at one side of the free end of the clamp, and plate Y, located substantially as described, and to which plate said flange is connected substantially as and for the purposes specified.

BEN. TEIPEL.

Witnesses:
HENRY TEIPEL,
JNO. W. STREHLI.